United States Patent [19]

Jenkins et al.

[11] 4,448,608

[45] May 15, 1984

[54] COLORED INORGANIC COMPLEX FOR USE AS A PIGMENT AND COMPOSITIONS CONTAINING IT

[75] Inventors: John W. Jenkins; John Wolstenholme, both of Reading, England

[73] Assignee: Johnson Matthey Public Limited Company, London, England

[21] Appl. No.: 469,446

[22] Filed: Feb. 24, 1983

[30] Foreign Application Priority Data

Dec. 30, 1982 [GB] United Kingdom ............... 8236866

[51] Int. Cl.$^3$ .............................................. C09C 1/36
[52] U.S. Cl. ................................... 106/292; 106/299
[58] Field of Search ............................... 106/292, 299

[56] References Cited

U.S. PATENT DOCUMENTS

| 2,253,551 | 8/1941 | Booge .................................. | 106/292 |
| 2,280,795 | 4/1942 | Cole et al. ........................... | 106/292 |
| 2,379,019 | 6/1945 | McCord et al. ..................... | 106/292 |
| 3,337,358 | 8/1967 | Vossen ................................. | 106/292 |
| 3,424,551 | 1/1969 | Owen ................................... | 106/292 |

*Primary Examiner*—James Poer
*Attorney, Agent, or Firm*—Cushman, Darby & Cushman

[57] ABSTRACT

A colored inorganic complex of titanium, stannous and zinc oxides for use in making pigments capable of imparting for example red, yellow or green colors to plastics, paints, glasses or ceramics without reliance on toxic moieties. A wider range of colors can be obtained if the complex is used in a pigment system comprising excess oxides of titanium and zinc or stannic tin. The complex is preferably made by adding an acidified aqueous solution of ions of the metals (e.g. as metal sulphates or metal halides) to alkali so as to precipitate the oxides or oxide precursor such as hydrated oxides which are then washed and fired at over 450° C. to form the complex. The colors obtained may be adjusted by the presence of traces of residual alkali metal moiety.

14 Claims, 5 Drawing Figures

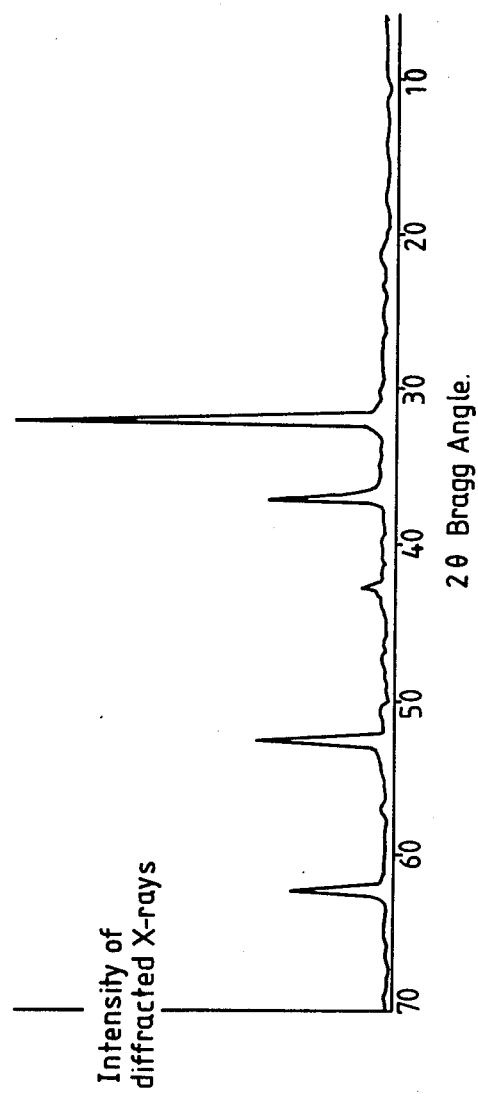
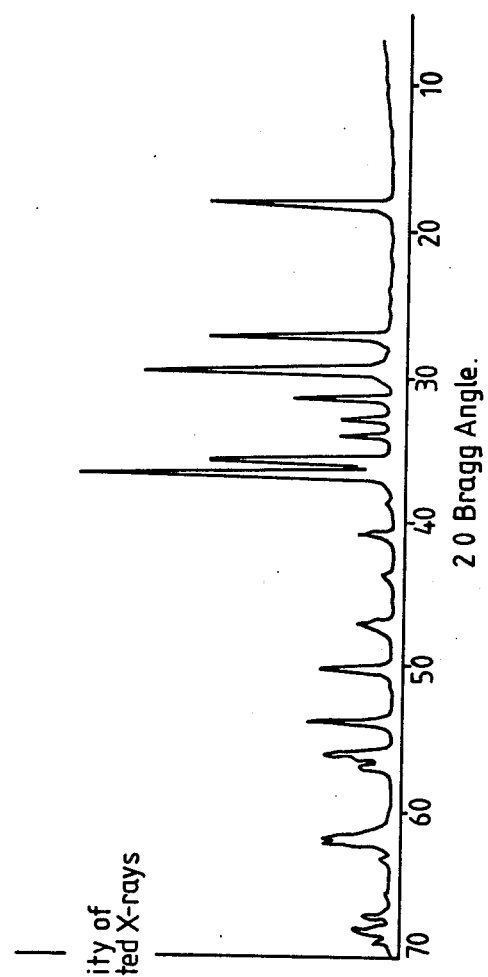

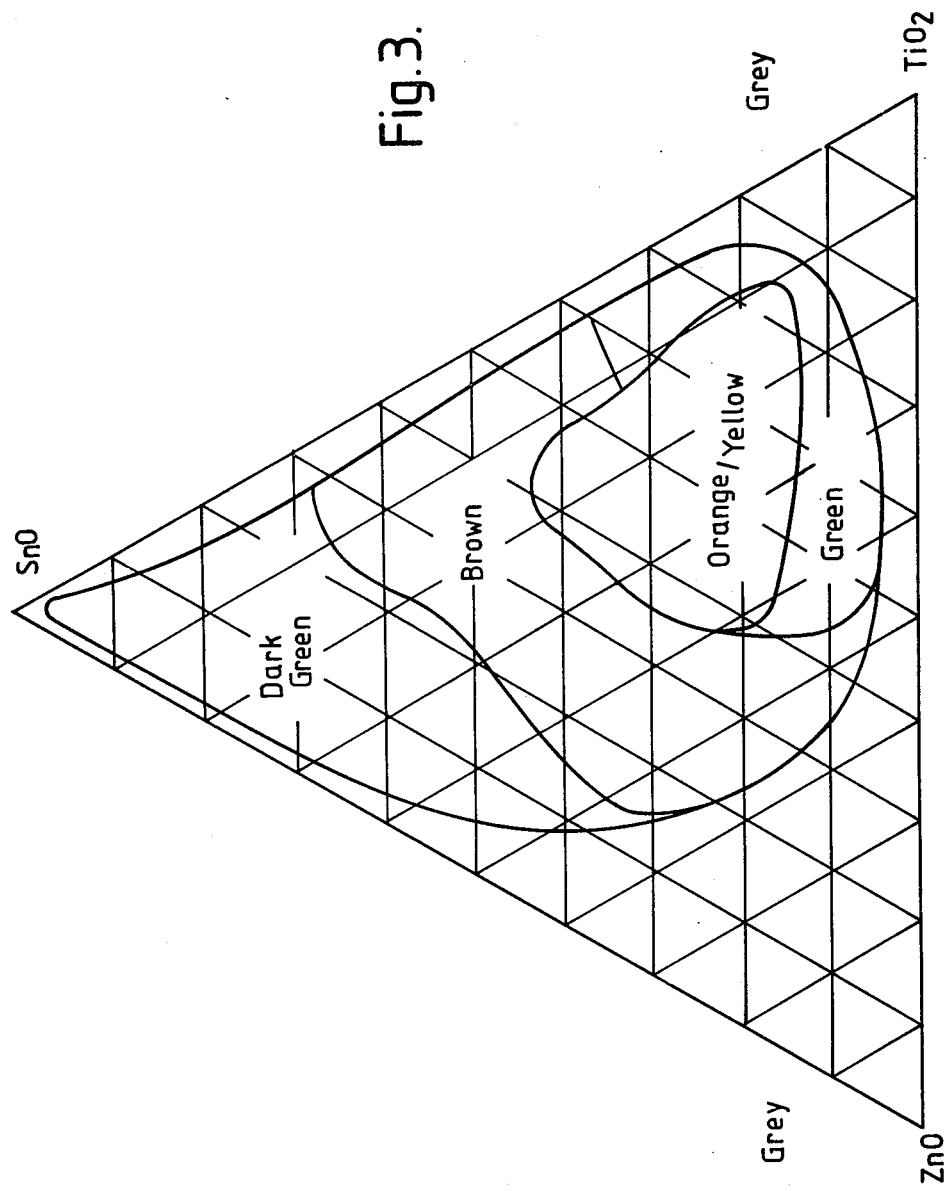

I is Brown    II is Orange    III is Yellow

IV is Green

COLORED INORGANIC COMPLEX FOR USE AS A PIGMENT AND COMPOSITIONS CONTAINING IT

This invention relates to a coloured inorganic complex of stannous oxide with titanium and zinc oxides suitable for use as a pigment, to a pigment system comrising the complex and additional titanium and/or zinc oxide and optionally stannic oxide, to a method for making the complex or pigment system and to compositions containing the complex or pigment system.

The complex is coloured in the sense that when it is seen by a normal unaided human eye receiving light reflected from the complex, then the complex is perceived as exhibiting a dominant colour which is describable in terms of at least one of four so-called "basic colours." These basic colours (namely red, yellow, green and blue) are used to describe colour as a physiological sensation as opposed to colour as a physical property analysable by spectroscopy. The use of the four basic colours together with two other parameters (which are "lightness" and "chroma") to describe colour as perceived by the eye is explained in Chapter 1 of the book "Coloring of Plastics" edited by T. G. Webber and published by Wiley-Interscience of New York in 1979. The contents of Chapter 1 of this book are herein incorporated by reference. In particular the book outlines the CIELAB colour co-ordinates system for describing colour and also explains how a colour can be intermediate in the sense that it is describable in terms of two or more basic colours. For example orange as perceived by the eye is describable as a combination of red and yellow even though to a spectroscopist a pure orange might contain only one wavelength of light. The book explains how colours can be expressed as an angle of from 0° to 360° and that this angle is called the "hue" of the colour. For example reds have hue angles of about 0°, yellows of about 90°, greens of about 180° and blues of about 270°. Intermediate angles represent shades describable in terms of more than one basic colour (for example 60° represents an orange which is describable in terms of red and yellow).

This invention especially relates to a complex or pigment system having a warm colour, that is to say a colour describable in terms of one or more of the red, yellow or green basic colours.

Warm colours are obtainable using a wide range of traditional artists' materials such as chrome yellow, Venetian red or the numerous umbers and ochres. However many of the traditional materials hve only poor chroma (ie they have dull colours) and they often contain undesirable metal moieties. Metal moieties can be undesirable if they are toxic (for example antimony, lead or mercury moieties) or if they promote thermal degradation of organic materials (for example moieties of chromium, iron, copper or similar metals from Groups 6b, 7b, 8 or 1b of the Periodic Table as shown in the 60th edition of the "CRC Handbook of Chemistry and Physics" published in 1979 by CRC Press Inc of Boca Raton, Fla.).

Warm colours are also obtainable using pigments containing cadmium and at present such pigments are commercially important because of their high chroma and colour strength. Recently doubts have been expressed concerning the toxicity of cadmium moieties and even though these doubts may be unfounded, they have nevertheless created an interest in warm coloured pigments which need not contain cadmium or which contain lower concentrations of cadmium.

It is an object of this invention to provide a complex suitable for use in making pigments or a pigment system comprising the complex, the complex or system having a colour describable in terms of at least one of the four basic colours (especially a warm colour) and having the ability to generate the colour without reliance on cadmium moiety or a moiety of any other undesirable metal, especially antimony, chromium, iron or copper. Another object is to provide a method for making such complexes or systems. A further object is to provide compositions containing the complexes or systems.

Accordingly this invention provides an inorganic complex of stannous oxide with titanium dioxide and zinc oxide having a colour describable in terms of at least one of the four basic colours which are red, yellow, green and blue and especially such a complex having an X-ray powder diffraction pattern in which the four greatest peaks in the intensity of diffracted copper $K\alpha$ X-rays occur at $2\theta$ Bragg angles of $62.1°+/-0.7°$, $52.2°+/-0.7°$, $36.3°+/-0.7°$ and $31.3°+/-0.7°$. The use of the $2\theta$ Bragg angle and copper $K\alpha$ X-rays is discussed in the book "Elements of X-ray Diffraction" by B. D. Cullity published in 1956 by Addison-Wesley Publishing Company Inc. of Reading, Mass. (see pages 149 to 153 the contents of which are herein incorporated by reference). Stannous oxide is often black whereas both titanium dioxide and zinc oxide are white and a mixture of the oxides is grey so the existence in the complex of a colour describable in terms of the four basic colours indicates that the complex exists in a state which involves some interaction between at least some stannous moieties and at least some of the other metal moieties. It is possible that at least some titanium and tin moieties may take part in redox reactions in which the four oxidation state of titanium in titanium dioxide may be reduced whilst the two oxidation state of at least some tin in stannous oxide is increased. However it is not understood precisely how the interaction affects the moieties although presumably at least some of the energy levels of orbitals around the moieties (especially orbitals around stannous moieties) must be altered and so at least to that extent the interaction may be chemical. It seems probable that the complex can be expressed in terms of the formula:

$(TiO_2)_n SnO.ZnO$, where n is from 1 to 3, probably 2. The formula specifies the proportions of the moieties in the complex and is not necessarily indicative of their chemical bonding.

Evidence of strong interaction in the complex is also provided by the simplicity of the X-ray powder diffraction pattern obtained from the complex as compared with the pattern obtained from a physical mixture of the oxides. In addition, the pattern obtained from the complex has four major peaks, two of which occur at 20 Bragg angles of over 50° whereas in the pattern from the mixture, there are five major peaks all of which occur at 20 Bragg angles below 40°.

Formation of the complex not only converts black and white oxides into a coloured material, but it also provides a coloured material of good chroma. Moreover, the coloured material does not need to rely on antimony or cadmium moieties or moieties of other undesirable metals in order to obtain colour. Titanium, tin and zinc moieties are all widely accepted as being toxicologically safe and all are less thermally degrading towards organic materials than say iron or copper materials.

This invention also provides a pigment system comprising the complex and additional titanium and/or zinc oxides. The presence of such oxides in excess of the amount needed to form the complex increases the range of colours which can be obtained. The presence of the additional oxides is especially helpful in obtaining a wider range of warm colours. Preferably warm coloured systems should have a chroma of at least 40 on the CIELAB scale. For this reason it is preferred that the pigment system should have a composition which can be expressed in terms of the formula:

$$(TiO_2)_a SnO(ZnO)_b$$

where a is from 0.3 to 5, and
b is from 0.04 to 5.

Again the formula specifies the proportions of the various moieties in the pigment system and is not necessarily indicative of the nature of their chemical bonding. Varying the proportions of stannous oxide in the system or varying the ratio of titanium to zinc permits adjustments to be made in the colour of the system. High chroma is obtained when a is from 1.5 to 4.5 and b is from 0.5 to 2.

An even wider range of colours can be obtained from pigment systems containing the complex together with stannic oxide and optionally additional titanium and/or zinc oxides. The X-ray powder diffraction pattern obtained from pigment systems containing stannic oxide contains the four peaks characteristic of the complex (albeit superimposed on a pattern of peaks attributable to stannic oxide) and this suggests that the presence of stannic oxide in the system does not significantly alter the nature of the interactions which occur in the complex. It is not clear to what extent (if any) the stannic moieties undergo redox reactions similar to those postulated for titanium moieties. A good combination of lightness and chroma can be obtained from systems having compositions which can be expressed in terms of the following formula:

$$(TiO_2)_c SnO(ZnO)_d (SnO_2)_e$$

where
c is from 0.4 to 6.2
d is from 0.1 to 6.2, and
e is from 0.2 to 7.

Again the formula is not necessarily indicative of chemical bonding. The presence of stannic oxide produces good yellows and some greens together with colours which are perceived as blue by some observers. A chroma of over 60 can be obtained from complexes in which c is from 0.7 to 3, d is from 0.7 to 2 and e is from 0.2 to 3.

This invention also provides a method for making the complex or pigment system comprising the complex which comprises firing an intimate mixture of stannous oxide with titanium dioxide, zinc oxide and optionally stannic oxide at a temperature of over 450° C. under a non-oxidising and a non-reducing atmosphere. It has been discovered that if firing is performed below about 650° C., the colour of the complex may depend on the temperature of firing and so for easily reproducible results it is preferred to fire at a temperature of at least 700° C. It has also been discovered that the lightness of the complex is high if the firing temperature is from 750° to 850° C. and that the chroma is high if the firing temperature is from 850° to 930° C. Accordingly for optimum combinations of chroma and lightness, it is preferred to fire at temperatures of from 825° to 875° C. Complexes have also been made by firing at temperatures as high as 1000° C.

A non-oxidising and non-reducing atmosphere is necessary in order to minimise oxidation or reduction of the stannous oxide during the formation of the complex. The atmosphere may consist of for example nitrogen, argon, steam or carbon dioxide. The optimum firing time depends on various factors such as the intimacy of the mixture of moieties and the volume of mixture being treated. Generally a firing time of up to 60 minutes is preferred although the complex is not adversely affected by heating for more than 60 minutes. Colour has been obtained when the firing time was as short as 30 seconds.

After firing, the complex or pigment system should preferably be ground to produce particles having a number average dimension equal to about half the wavelength of light having a colour as determined by spectroscopy which is similar to the colour of the complex or system as perceived by the eye. For example for complexes perceived to be yellow, the preferred number average maximum particle dimension is from 230 to 300 nm (especially 250 to 280 nm), for orange it is 260 to 300 nm and for red it is 300 to 360 nm. The ground complexes or systems may be used directly as pigments or they may be mixed with other materials such as other colouring agents, brightening agents, diluents or carriers.

The intimate mixture presented for firing is preferably made by mixing an aqueous alkaline solution preferably of pH below 11 with an aqueous acidified solution of tin, titanium and zinc ions (preferably a solution of tin, titanium and zinc sulphates or halides, especially chlorides) preferably under non-oxidising and non-reducing conditions (preferably at 15° to 70° C.) so as to cause co-precipitation of the corresponding metal oxides. It is preferred that the alkaline solution comprises an alkaline carbonate or bicarbonate so as to keep the pH of the alkaline solution below 11 and so that carbon dioxide liberated during the co-precipitation can be used to generate or maintain non-oxidising and non-reducing conditions. It is possible to precipitate stannous oxide from stannic ions if the solution also contains triply charged titanium ions because the following redox reaction will occur:

$$2Ti^{3+} + Sn^{4+} \rightarrow 2Ti^{4+} + Sn^{2+}$$

However it is preferred to obtain the stannous oxide from stannous ions because the use of stannous ions has been found to facilitate production of co-precipitates containing a wider range of compositions. Accordingly the most preferred method comprises adding an aqueous solution of stannous chloride, zinc chloride, titanium tetrachloride and optionally stannic chloride in concentrated hycrochloric acid to an aqueous solution of alkali (preferably lithium, sodium, potassium or caesium) carbonate or bicarbonate whereupon there occurs co-precipitation of a very intimate mixture of the metal oxides or precursors convertible to the oxide on firing. Typical precursors include hydroxides or hydrated oxides.

Residual alkali metal moieties in amounts over 300 atomic parts per million atomic parts of the complex or system (appm) affect the colour of the complex or pigment system. Therefore, for reproducible results, the co-precipitate should be washed in distilled water to reduce the level of residues to below 300 appm. Alternatively, the presence of alkali metal residues may be utilised to adjust the colour of the complex or pigment system in which case washing should be performed to achieve a pre-determined level of residues. Preferably this level should be from 300 to 6000 appm. On the large scale, washing may be conveniently performed by stirring the co-precipitate in repeated additions of water which are each removed by decantation or filter pressing prior to the next addition. On the small scale, washing may be performed using the Soxhlet method. After washing it may be convenient to dry the co-precipitate (preferably by heating to 250° to 350° C.) before firing.

The complex or pigment systems may be used to colour a wide variety of colourable substrates especially those hitherto coloured using pigments containing antimony titanates or cadmium moieties. Accordingly this invention also provides a composition comprising a colourable substrate and the complex or a pigment system comprising the complex. Typical substrates include those comprising organic polymers (for example those used in plastics or paints) or those comprising refractory materials such as glasses or ceramics. Typical finished compositions may comprise from 0.1 to 10% by weight (based on the weight of the substrate) of the complex or pigment system whereas masterbatch compositions may contain from 5 to 80% (by weight of the substrate) of the complex or system. The complexes are sufficiently stable in air up to temperatures of at least 350° C. and so can be mixed into substrates by most of the conventional mixing techniques including those which generate heat by means of high shear, for example Banbury or two roll milling.

The invention is further illustrated by means of the drawings and Examples of which Examples A to U are comparative.

FIG. 1 shows the X-ray diffraction pattern obtained from a complex according to the invention made as described in Example 1.

FIG. 2 shows the X-ray diffraction pattern obtained from a physical mixture having the same composition of moieties as the complex described in Example 1.

FIG. 3 shows a triangular co-ordinates graph which correlates the composition of pigment systems comprising various ammounts of stannous oxide, zinc oxide and titanium dioxide with the perceived colour of the complex.

EXAMPLE 1

Figure 4:
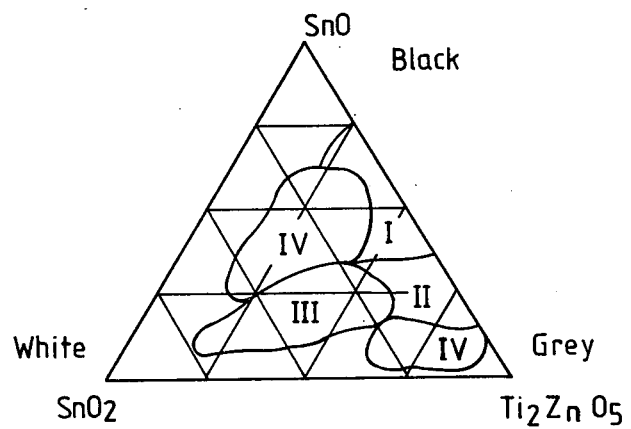
FIG. 4 shows a triangular co-ordinates graph which correlates the composition of pigment compositions comprising various amounts of stannous oxide, zinc oxide and titanium dioxide expressed as $Ti_2ZnO_5$ and also stannic oxide with the perceived colour of the complex.

A complex comprising moieties in the proportions believed to be represented by the formula $(TiO_2)_2 \cdot SnOZnO$ was made as follows:

Titanium tetrachloride, stannous chloride and zinc chloride were dissolved at room temperature in concentrated aqueous hydrochloric acid to produce a solution of pH 0.5 in which the molar ratio of titanium to stannous to zinc ions was 2:1:1. The solution was added to an aqueous solution of sodium carbonate contained in a closed vessel, under nitrogen. The mixture was stirred and carbon dioxide was liberated so helping to maintain non-oxidising and non-reducing conditions. Hydrated titanium dioxide, stannous oxide and zinc oxide coprecipitated and formed an intimate mixture of the hydrates. Stirring was continued until co-precipitation was complete.

The co-precipitate was filtered from the solution, washed to produce a level of sodium moiety below 300 appm and then dried by heating under nitrogen to 300° C. The dried co-precipitate was fired to 850° C. for thirty minutes whereupon it developed an orange/yellow colour indicative of complex formation. The complex was cooled and ground into particles having a number average particle size of 5000 nm. (The optimum particle size is expected to be 250 nm, but so far such sizes have not been studied). The complex was found to be adequately stable to oxidation when heated in air to at least 300° C.

The (reflected) colour co-ordinates (according to the 1976 CIELAB recommended scale) for the complex were determined from a dispersion of the ground complex in a plaque 2 mm thick of cured colourless polyvinyl chloride (ie PVC) plastisol. The plastisol consisted of 60% (by weight of the plastisol) of PVC and 40% of di-iso-octyl plathalate plasticiser and into this was stirred 3.5% (by weight of the plastisol) of the ground complex. The plastisol was cured by heating to 140° C. for 20 minutes. The colour co-ordinates were determined by illuminating the plaque using a diffuse source approximating to a standard D65 illuminant which excluded any specular component (that is to say a source designed to simulate natural North light) and observing light reflected from the plaque within a solid angle of 10° using an International Colour Systems 'Micromatch' commercial spectrophotometer which filtered out the ultra violet component of the light. The colour co-ordinates obtained are shown in Table 2.

The X-ray powder diffraction pattern obtained from the complex is shown in FIG. 1. The pattern was obtained using copper $K\alpha$ X-rays. FIG. 1 shows that the four greatest peaks in the intensity of diffracted X-rays occur at $2\theta$ Bragg angles of 62.1°, 52.2°, 36.3° and 31.3°.

In contrast, a physical mixture of titanium dioxide, stannous oxide and zinc oxide in which the molar ratios of the oxides is 2:1:1 respectively was found to be grey and to have the complex X-ray powder diffraction pattern as shown in FIG. 2. FIG. 2 also shows that the five greatest peaks in the X-ray diffraction pattern are all below 40°.

The differences in colour and X-ray diffraction patterns between the complex and the physical mixture all indicate that strong interactions occur between the various moieties in the complex.

EXAMPLES 2 TO 6

A mixture comprising titanium dioxide, stannous oxide and zinc oxide in a molar ratio of 2:1:1 respectively was made by ball milling together the oxides for 30 minutes. Different portions of the mixture were then fired at various temperatures for various periods of time as shown in Table 1. Coloured complexes were obtained and their colours are recorded in Table 1. However in all cases the chroma of the complexes was below that obtained using the procedure of Example 1 and this is indicative of the benefit of using the very intimate mixtures obtained by co-precipitation.

TABLE 1

| Example | Firing Temp °C. | Time in hours | Colour |
|---|---|---|---|
| 2 | 850 | 0.5 | Light Brown |
| 3 | 850 | 4 | Intense orange/brown |
| 4 | 850 | 10 | Intense orange/brown |
| 5 | 900 | 2 | Light red/brown |
| 6 | 1000 | 3.5 | Dark red/brown |

EXAMPLES 7 TO 20 AND COMPARATIVE EXAMPLES A TO H

For Examples 7 to 20 the procedure of Example 1 was repeated except that different proportions of titanium, stannous and zinc chlorides were used so as to produce a range of pigment systems containing additional titanium or zinc oxides and having the formula $(TiO_2)_x SnO(ZnO)_y$ where x and y are specified in Table 2. The CIELAB colour co-ordinates for each complex in cured PVC are also shown in Table 2. It will be seen that high lightness factors occurred when x was 2 and y was 1. The best chroma occurred when x was 4.5 and y was 1.1. Table 2 also contains an attempted correlation between perceived colour and composition. Because of the subjective nature of assessments of perceived colours containing one or more of the four basic colours, an alternative correlation between perceived colour and composition is shown in FIG. 3. FIG. 3 shows that the that the tendency to orange/yellow colours is greatest in a central areas around the composition $(TiO_2)_2.SnO.ZnO$. The central area is partially surrounded by a crescent of green systems in which the proportions of titanium dioxide and zinc oxide are low and by a crescent of brown systems in which the proportion of stannous oxide is moderately high. High proportions of stannous oxide give rise to dark reen systems. Precisely where the colours give way to greys is a judgement too subjective to specify.

For Comparative Examples A to H, the procedure of Example 1 was again repeated except that only one or two of the metal chlorides were used so as to produce mixed oxides having proportions as shown in Table 2. The Comparative Examples illustrate that if one of the three metal oxides is absent, the chroma is well below 25. At chromas below 25, the hue angle is of questionable usefulness.

TABLE 2

| Example | Molar Ratio of oxides TiO₂ x | SnO | ZnO y | *CIELAB colour co-ordinates L | C | H | Perceived Colour |
|---|---|---|---|---|---|---|---|
| A | 1 | 0 | 0 | 90.5 | 4.9 | — | White |
| B | 0 | 1 | 0 | 25.4 | 1.4 | — | Black |
| C | 0 | 0 | 1 | — | — | — | White |

TABLE 2-continued

| Example | Molar Ratio of oxides TiO₂ x | SnO | ZnO y | *CIELAB colour co-ordinates L | C | H | Perceived Colour |
|---|---|---|---|---|---|---|---|
| D | 2 | 1 | 0 | 58.4 | 4.6 | — | Grey |
| E | 1.2 | 1 | 0 | 28.9 | 2.8 | — | Grey |
| F | 0.5 | 1 | 0 | 26.1 | 4.4 | — | Grey |
| G | 0 | 1 | 5.7 | 58.3 | 5.7 | — | Grey |
| H | 0 | 1 | 1 | 40.9 | 3.4 | — | Grey |
| 7 | 12.7 | 1 | 6.3 | 54.4 | 31.8 | 90 | yellow |
| 8 | 6.0 | 1 | 3.0 | 56.3 | 36.4 | 88 | yellow |
| 9 | 4.5 | 1 | 4.5 | 56.2 | 46.6 | 78.1 | orange/yellow |
| 10 | 4.5 | 1 | 1.1 | 62.4 | 64.1 | 68.5 | orange/yellow |
| 11 | 3.8 | 1 | 1.9 | 63.6 | 62.1 | 77.0 | orange/yellow |
| 12 | 3.3 | 1 | 2.3 | 53.6 | 46.2 | 72.9 | orange/yellow |
| 13 | 2.2 | 1 | 3.1 | 49.2 | 43.0 | 71.2 | orange/yellow |
| 14 | 2.0 | 1 | 1.5 | 55.8 | 54.4 | 60.6 | orange |
| 1 | 2 | 1 | 1 | 58.3 | 58.0 | 57.3 | orange |
| 15 | 1.5 | 1 | 1.5 | 45.4 | 41.3 | 58.9 | orange |
| 16 | 1.3 | 1 | 1.7 | 52.3 | 46.2 | 64.4 | orange |
| 17 | 1.0 | 1 | 0.5 | 48.3 | 55.4 | 55.8 | red/orange |
| 18 | 0.3 | 1 | 0.4 | 53.0 | 43.9 | 84.1 | yellow |
| 19 | 0.2 | 1 | 0.8 | 40.5 | 35.2 | 64.0 | orange |
| 20 | 0.3 | 1 | 0.1 | 43.8 | 35.2 | 74.6 | orange/yellow |

*L is lightness factor
C is chroma
H is hue angle (degrees)

EXAMPLES 22 TO 41 AND COMPARATIVE EXAMPLES I TO O

Figure 5:
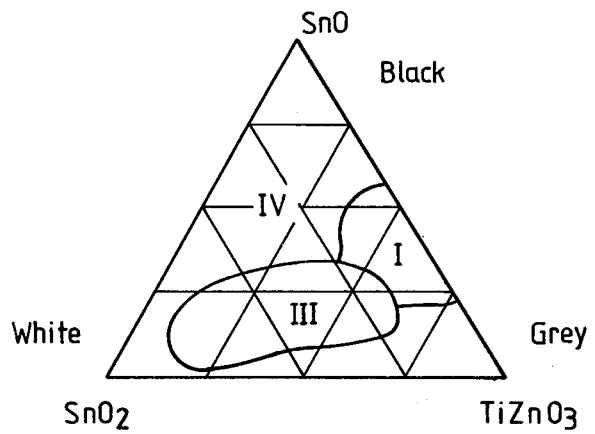
FIG. 5 shows a triangular co-ordinates graph which correlates the composition of pigment compositions comprising various amounts of stannous oxide, zinc oxide and titanium dioxide expressed as $TiZnO_3$ and also stannic oxide with the perceived colour of the complex.

For Examples 22 to 41 the procedure of Example 1 was repeated except that different proportions of titanium, stannous and zinc chlorides were used together with various amounts of stannic chloride so as to produce a range of pigment systems having the formula $(TiO_2)_x SnO(ZnO)_y(SnO)_z$ where x, y and z are specified in Table 3. The CIELAB colour co-ordinates in PVC for each system ae also shown in Table 3. It will be seen that good combinations of lightness factor and chroma occurred when x was from 1 to 3, y was from 0.5 to 1.5 and z was from 0.2 to 2. Again because of the subjective nature of perceived colour, alternative correlations between composition and perceived colour are shown in FIGS. 4 and 5. It will be seen that the presence of stannic oxide extends the range of colours in the direction of orange to yellow and green. Again the onset of true white, black and greys is diffficult to specify and to some observers some of the browns appear reddish.

The X-ray powder diffraction pattern of the complex made according to Example 26 was obtained using copper K radiation and compared with the pattern obtained for the complex of Example 1.

TABLE 3

| Example | Molar Ratio of Oxides TiO₂ x | SnO | ZnO y | SnO₂ z | *CIELAB colour co-ordinates L | C | H | Perceived Colour |
|---|---|---|---|---|---|---|---|---|
| I | 0 | 0 | 0 | 1 | 76.7 | 11.6 | — | White |
| J | 2 | 0 | 1 | 1 | 78.8 | 13.6 | — | White |
| K | 0 | 1 | 1 | 2 | — | — | — | Grey |
| L | 2 | 1 | 0 | 0.3 | 35.5 | 5.4 | — | Grey |
| M | 2 | 1 | 0 | 1 | 46.0 | 22.0 | — | Grey |
| N | 1.9 | 1 | 0 | 2.9 | 50.3 | 21.1 | — | Grey |
| O | 2 | 1 | 0 | 12.4 | 55.0 | 20.2 | — | Grey |
| 21 | 10 | 1 | 5 | 4 | 56.6 | 35.7 | 72.7 | Orange/yellow |
| 22 | 6 | 1 | 6 | 1 | 66.5 | 42.7 | 91.5 | yellow |
| 23 | 4 | 1 | 2 | 1 | 55.7 | 57.6 | 66.8 | orange |
| 24 | 2.5 | 1 | 1.3 | 0.3 | 60.9 | 68.6 | 66.8 | orange |
| 25 | 2 | 1 | 1 | 0.4 | 65.7 | 73.5 | 69.0 | orange |
| 26 | 2 | 1 | 1 | 1 | 70.3 | 67.7 | 75.9 | orange/yellow |

TABLE 3-continued

| Example | Molar Ratio of Oxides | | | | *CIELAB colour co-ordinates | | | Perceived Colour |
|---|---|---|---|---|---|---|---|---|
| | $TiO_2$ x | SnO | ZnO y | $SnO_2$ z | L | C | H | |
| 27 | 2 | 1 | 1 | 1.7 | 72.9 | 66.2 | 80.5 | yellow |
| 28 | 2 | 1 | 1 | 2.7 | 78.8 | 53.5 | 90.8 | yellow |
| 29 | 2 | 1 | 1 | 3.1 | 74.1 | 56.6 | 87.4 | yellow |
| 30 | 1.5 | 1 | 1.5 | 1 | 72.0 | 60.3 | 77.4 | orange/yellow |
| 31 | 1.4 | 1 | 0.7 | 1.9 | 72.2 | 62.9 | 80.5 | yellow |
| 32 | 1.4 | 1 | 0.7 | 6 9 | 74.4 | 40.6 | 91.8 | yellow |
| 33 | 1.1 | 1 | 1.1 | 1.9 | 67.8 | 60.5 | 75.3 | orange/yellow |
| 34 | 1 | 1 | 1.5 | 2.9 | 75.2 | 61.1 | 86.3 | yellow |
| 35 | 0.9 | 1 | 0.5 | 0.9 | 68.6 | 57.4 | 75.9 | orange/yellow |
| 36 | 0.7 | 1 | 0.4 | 0.5 | 52.7 | 43.0 | 82.8 | yellow |
| 37 | 0.7 | 1 | 0.7 | 0.9 | 68.1 | 55.3 | 82.4 | yellow |
| 38 | 0.7 | 1 | 0.4 | 3.0 | 64.3 | 49.5 | 82.8 | yellow |
| 39 | 0.5 | 1 | 0.5 | 3.0 | 73.4 | 49.9 | 90.2 | yellow |
| 40 | 0.5 | 1 | 0.2 | 1.6 | 45.1 | 25.5 | 88.6 | yellow |
| 41 | 0.4 | 1 | 0.2 | 0.3 | 47.4 | 38.4 | 82.4 | yellow |

The $2\theta$ Bragg angles at which the four greatest peaks in the intensity of the diffracted X-rays are shown in Table 4. It will be seen that the presence of stannic oxide produces very little shift in the peaks which indicates that the presence of stannic oxide does not significantly affect the interactions which occur in the complex.

TABLE 4

| Example | Complex | $2\theta$ Bragg Angles (degrees) | | | |
|---|---|---|---|---|---|
| 1 | $(TiO_2)_2SnO.ZnO$ | 62.1 | 52.2 | 36.3 | 31.3 |
| 26 | $(TiO_2)_2SnO.ZnO.SnO_2$ | 62.0 | 52.1 | 36.2 | 31.2 | for Comparative Examples I to O, the procedure of Example 1 was again repeated except that at least one of the metal chlorides was omitted so as to produce mixed oxides having proportions as shown in Table 3. The Comparative Examples illustrate that if one or more of the titanium, stannous or zinc oxide components is absent, the chroma is below 25 and hue angle was not determined.

COMPARATIVE EXAMPLES P AND Q

The procedure of Example 1 was repeated except that ferrous chloride was used instead of stannous chloride in Example P and instead of zinc chloride in Example Q so as to produce compositions having the formulae $(TiO_2)_2FeO.ZnO$ or $(TiO_2)_2SnO.FeO$ respectively. Despite the presence of the ferrous moiety, the composition had only a poor chroma comparable with that of traditional artists' materials.

COMPARATIVE EXAMPLES R AND S

The colours of PVC plaques made according to Examples 1 and 28 were compared with the colours of similar plaques containing the same weight percentage of a commercial cadmium pigment having approximately the same hue angle as the complex in the plaques. The CIELAB colour co-ordinates of the plaques together with the nature of the colouring materials is shown in Table 5.

TABLE 5

| Example | Pigment | CIELAB colour co-ordination | | | Perceived Colour |
|---|---|---|---|---|---|
| | | L | C | H | |
| 1 | $(TiO_2)_2SnO.ZnO$ | 60 | 60 | 60 | orange |
| R | cadmium seleno-sulphide | 70 | 97 | 67 | orange |

TABLE 5-continued

| Example | Pigment | CIELAB colour co-ordination | | | Perceived Colour |
|---|---|---|---|---|---|
| | | L | C | H | |
| 28 | $(TiO_2)_2SnO.ZnO(SnO_2)_{2.7}$ | 79 | 54 | 91 | yellow |
| S | cadmium zinc-sulphide | 86 | 86 | 95 | yellow |

Table 5 shows that the colouring properties of the complex are almost as good as those of the cadmium pigments.

EXAMPLES 42 AND 43 AND COMPARATIVE EXAMPLES T AND U

The orange complex made according to Example 1 or the orange cadmium sulphide pigment used in Comparative Example R were melt-mixed into either high density polyethylene (HDPE) or acrylonitrile-butadiene-styrene terpolymer (ABS) by feeding both the polymer and the colouring material to the screw of a conventional injection moulding machine operating at 200° C. The melt obtained contained 1% (by weight of the polymer) of the colouring material. The melt was injection moulded at 200° C. into plaques 3 mm thick. The plaques were allowed to cool to room temperature and the CIELAB colour co-ordinates of their colours were determined. The results are shown in Table 6.

TABLE 6

| Example | Pigment | Polymer | CIELAB Colour co-ordinates | | |
|---|---|---|---|---|---|
| | | | L | C | H |
| 42 | $(TiO_2)_2SnO.ZnO$ | HDPE | 66 | 57 | 75 |
| T | cadmium seleno-sulphide | HDPE | 64 | 71 | 67 |
| 43 | $(TiO_2)_2SnO.ZnO$ | ABS | 65 | 50 | 74 |
| U | cadmium seleno-sulphide | ABS | 62 | 69 | 65 |

EXAMPLES 43 TO 47

A paint composition was made by mixing 0.68 g of alkyd resin (known as "Uralac" P470 supplied by Synthetic Resins Ltd of Liverpool) with 0.3 g of white spirit and ball milling the mixture for 15 minutes. Various ground complexes of formula $(TiO_2)_2SnOZnO(SnO_2)_z$ as specified in Table 7 were added to the mixture to produce a composition containing 8% (by weight of the mixture) of the ground complex. The compositions were then ball milled for a further 15 minutes to produce a paint. A layer 36 μm thick of each paint was applied to a card and the layers were allowed to dry for 8 hours. The CIELAB colour co-ordinates for each layer were determined as in Example 1 and the results are shown in Table 7.

TABLE 7

| Example | Value of z | CIELAB Colour co-ordinates | | | Perceived Colour |
|---|---|---|---|---|---|
| | | L | C | H | |
| 43 | 0 | 66.6 | 64.6 | 62.7 | orange |
| 44 | 0.4 | 72.5 | 72.1 | 68.6 | orange |
| 45 | 1 | 81.6 | 70.4 | 82.3 | yellow |
| 46 | 1.7 | 83.9 | 69.4 | 86.0 | yellow |
| 47 | 2.7 | 88.2 | 56.2 | 95.2 | yellow |

EXAMPLE 48

A soft glass enamel was made by adding 0.27 g of a ground complex made according to Example 1 to 3 g of a lead based bisilicate frit. The complex and frit were ball milled together for 15 minutes and then 1 g of pine oil and 0.2 g of hydrocarbon thinner were added to the milled mixture. Ball milling was resumed for 1 hour to produce a flux. A layer of flux 300 μm thick was applied to a glass microscope slide. The slide was fired in air by heating it to 500° C. at a rate of 9° C./minute, then to 550° C. at a rate of 4° C./minute and then it was maintained at 550° C. for 20 minutes before being allowed to cool to room temperature at a rate of 7° C./minute. An orange/yellow colour of good chroma and lightness was obtained.

EXAMPLES 49 TO 52

These Examples illustrate the changes in colour caused by the presence of residual alkali metal moieties in excess of 300 appm but below 6000 appm.

The procedure of Example 1 was repeated using various alkali metal carbonates as specified in Table 8 and curtailing washing so as to achieve a level of alkali metal residue which was in the range of 300 to 6000 appm. The results obtained are as shown in Table 8 together with the results obtained from Example 1.

TABLE 8

| Example | Metal ion in the carbonate used | Colour Co-ordinates L | C | H | Colour after firing |
|---|---|---|---|---|---|
| 1 | Sodium (300 appm) | 58.3 | 56.0 | 57.3 | Orange |
| 49 | Sodium (3000 appm) | 65.0 | 59.7 | 66.6 | Yellow |
| 50 | Lithium | — | — | — | Red/Brown |
| 51 | Potassium | 74.1 | 54.4 | 83.1 | Green/Yellow |
| 52 | Caesium | 83.6 | 48.3 | 98.5 | Yellow |

We claim:

1. An inorganic complex of stannous oxide with titanium and zinc oxides the complex having a colour describable in terms of at least one of the four basic colours which are red, yellow, green and blue.

2. An inorganic complex according to claim 1 having an X-ray diffraction pattern in which the four greatest peaks in intensity of diffracted copper Kα X-rays occur at 2θ Bragg angles of $62.1°+/-0.7°$, $52.2°+/-0.7°$, $36.3°+/-0.7°$ and $31.3°+/-0.7°$.

3. An inorganic complex according to claim 2 in which the proportions of tin, titanium and zinc moieties in the complex can be expressed in terms of the formula $(TiO_2)_2SnO \cdot ZnO$.

4. A complex according to claim 1 which contains from 300 to 6000 atomic parts of alkali metal moiety per million atomic parts of the complex.

5. A pigment system comprising a complex as claimed in claim 1 and an additional amount of at least one oxide selected from the group consisting of titanium dioxide and zinc oxide.

6. A pigment system according to claim 5 wherein the proportions of the tin, titanium, zinc and oxygen moieties in the complex can be expressed in terms of the formula $(TiO_2)_a SnO(ZnO)_b$ where a is from 0.3 to 5 and b is from 0.04 to 5.

7. A pigment system comprising a complex according to claim 1, together with stannic oxide and from 0 to 2 an uncomplexed oxide selected from the group consisting of titanium dioxide and zinc oxide.

8. A system according to claim 7 in which the proportions of the tin, titanium, zinc and oxygen moieties in the complex can be expressed in terms of the formula $(TiO_2)_c SnO(ZnO)_d(SnO)_e$ where c is from 0.4 to 6.2, d is from 0.1 to 6.2 and e is from 0.2 to 7.

9. A system according to claim 8 which contains from 300 to 6000 atomic parts of alkali metal per million atomic parts of the total system.

10. A method for making a complex as claimed in claim 1 or for making a pigment system comprising a complex as claimed in claim 1 which comprises heating an intimate mixture of stannous oxide with titanium dioxide, zinc oxide and optionally stannic oxide at a temperature of over 450° C. under a non-oxidising and non-reducing atmosphere.

11. A method according to claim 10 wherein the mixture of oxides is heated to a temperature of from 750° to 1000° C.

12. A method according to claim 10 wherein the mixture of oxides or their precursors is produced by mixing aqueous alkaline solution with an aqueous acidified solution of stannous, titanium, zinc and optionally stannic ions.

13. A composition comprising a colourable substrate and a complex as claimed in claim 1 or a pigment system comprising a complex as claimed in claim 1.

14. A composition as claimed in claim 13 wherein the colourable substrate is selected from the group consisting of substrates comprising organic polymers and substrates comprising refractory materials.

* * * * *